(12) United States Patent
Roeck et al.

(10) Patent No.: US 10,623,875 B2
(45) Date of Patent: Apr. 14, 2020

(54) SELF-DRYING HEARING AID AND METHOD FOR TRANSPORTING HUMIDITY OUT OF SUCH HEARING AID

(71) Applicant: Sonova AG, Staefa (CH)

(72) Inventors: Hans-Ueli Roeck, Hombrechtikon (CH); Markus Mueller, Maennedorf (CH)

(73) Assignee: Sonova AG, Staefa (CH)

( * ) Notice: Subject to any disclaimer, the term of this patent is extended or adjusted under 35 U.S.C. 154(b) by 92 days.

(21) Appl. No.: 16/061,715

(22) PCT Filed: Jan. 19, 2016

(86) PCT No.: PCT/EP2016/050948
§ 371 (c)(1),
(2) Date: Jun. 13, 2018

(87) PCT Pub. No.: WO2017/125130
PCT Pub. Date: Jul. 27, 2017

(65) Prior Publication Data
US 2018/0376264 A1 Dec. 27, 2018

(51) Int. Cl.
*H04R 25/00* (2006.01)
*B01D 61/42* (2006.01)

(52) U.S. Cl.
CPC ......... *H04R 25/652* (2013.01); *B01D 61/427* (2013.01); *H04R 25/60* (2013.01); *H04R 25/65* (2013.01); *H04R 25/305* (2013.01); *H04R 25/654* (2013.01); *H04R 25/658* (2013.01); *H04R 2225/61* (2013.01); *H04R 2460/03* (2013.01); *H04R 2460/17* (2013.01)

(58) Field of Classification Search
CPC ... H04R 25/654; H04R 1/086; H04R 2225/61
See application file for complete search history.

(56) References Cited

U.S. PATENT DOCUMENTS

2006/0044759 A1* 3/2006 Chebiam et al. ........ H05K 7/20
2019/0331142 A1* 10/2019 Chiriac et al. .......... F04F 99/00

FOREIGN PATENT DOCUMENTS

EP 1432286 A2 6/2004
WO 2013026829 A1 2/2013

OTHER PUBLICATIONS

International Search Report and Written Opinion, International Application No. PCT/EP2016/050948; Applicant Sonova AG; filed Jan. 19, 2016; dated Aug. 11, 2016; 8 pages.

* cited by examiner

Primary Examiner — Matthew A Eason (57) ABSTRACT

This invention relates to a hearing aid comprising at least one electroacoustic transducer; a signal processing circuitry, configured to receive from the at least an electroacoustic transducer an electrical input signal and/or to provide said at least an electroacoustic transducer with an electrical output signal; and power supply means configured to provide power to the electroacoustic transducer and to said signal processing circuitry; wherein the hearing aid further comprises at least one electroosmotic porous membrane configured to transport liquid and/or vapor outside of the hearing aid, or away from a component thereof.

20 Claims, 5 Drawing Sheets

SELF-DRYING HEARING AID AND METHOD FOR TRANSPORTING HUMIDITY OUT OF SUCH HEARING AID

The present invention relates generally to hearing aids, particularly to self-drying hearing aids which, by way of at least one electroosmotic membrane, are capable of eliminating humidity from their inside and/or from their components. More specifically, the hearing aids according to the present invention are designed to transport liquid and/or vapor outside of their own casings and/or away from any kind of electroacoustic transducer or other components they may employ.

The present invention also relates to a method of drying a wearable device by associating an electroosmotic membrane to said wearable device and to a corresponding use of such an electroosmotic membrane to obtain the transfer of liquid and/or vapor from an inside of the wearable device to an outside of such a wearable device and/or away from a component thereof.

In the following, the term hearing aid shall be understood as a device to be worn at the vicinity or directly within the ear of a person to improve the individual hearing capacity of this person. Such an improvement may include the prevention of the receiving of certain acoustic signals in terms of ear protection.

Hearing aids normally comprise at least one microphone as acoustic input element; at least one speaker as acoustic output element; and an electronic processing element, connected with said microphone and said speaker, for the processing and manipulation of electronic signals. This electronic processing element may comprise analogue or digital signal processing devices. Said components are usually arranged within at least one main case or shell of the hearing device.

Typically, the microphone acts as an electroacoustic transducer and receives acoustic signals, converts such signals into electrical signals and transmits them to the abovementioned electronic processing element.

The electronic processing element is part of a signal processing circuitry which, normally, performs various signal processing functions. Such signal processing functions can include amplification, background noise reduction, tone control, etc.

Normally, the signal processing circuitry outputs an electrical signal to a speaker, also called receiver. The speaker acts as an electroacoustic transducer and converts the electrical signal from the signal processing circuitry into an acoustic signal which is transmitted as audio into a user's ear.

The signal processing circuitry of current hearing aids typically comprises a digital signal processor, or DSP, which can be programmed to execute the functional tasks of dedicated signal processing algorithms. In today's hearing aids, the DSP can operate according to several different algorithms comprising respective systems of instructions, rules and parameters for performing specific tasks relative to the processing of the input signal. Thanks to such algorithms, the signal can be manipulated to more closely comply with the acoustic needs of a user and in modern hearing aids not only amplification for compensating a hearing loss, filtering and compression are enabled, but also more complex functions are made possible, such as adaptive directional functions for reducing the sound levels from the sides and rear, automatic mode switching dependent on the nature of the input sound or calibration based on measurements for better fitting to the individual ear.

In order to execute the above signal processing algorithms, a programmable digital signal processor generally cooperates in operation with a non volatile memory for storing and retrieving data. Such data can comprise setting, measurement or calibration parameters and characteristics to be taken into account in executing the step-by-step set of signal processing operations performed by the DSP, and in general the set of rules and instructions corresponding to the signal processing algorithms, commonly designated as firmware.

In relation to their application and user indication, and according to the corresponding main solutions available on the market, such hearing devices can be worn, for instance, behind the ear (BTE), within the ear (ITE) or completely within the ear (CIC). The latest design developments have made available hearing devices that are even smaller than completely within the ear (CIC) devices, aptly named invisible in the canal (IIC) hearing aids.

It will be recognized that the inventive features of the present invention are substantially compatible with any style of hearing aids, including the abovementioned models, as well as with hearing aids which are eyewear-mounted, implanted, body-worn, etc.

The features of the present invention are substantially compatible with all component arrangements corresponding to the abovementioned hearing aid models. The present invention can be incorporated, for instance, in behind the ear (BTE) hearing device models, particularly the ones traditionally using a hook and/or a tubing having at an end thereof a standard dome-shaped earpiece element to deliver the sound from the hearing aid to the patient's ear. Such a dome-shaped earpiece element can be, for instance, friction-fitted or clicked onto the abovementioned thin tubing. The present invention can also be incorporated in especially modified behind the ear (BTE) hearing device models, designatable as a receiver-in-the-canal (RIC) hearing aids, wherein the receiver is placed in the ear canal of a user to directly deliver sound into such ear canal. In such RIC hearing aids, seals such as domes are typically fit directly onto receivers.

The present invention can also be applied to within the ear (ITE) hearing aids having casings, also called shells, whose shape conforms to that of a specific ear canal; to completely within the ear (CIC) or even to invisible in the canal (IIC) hearing aids wherein a seal apparatus surrounds an acoustic assembly core comprising a receiver in the user's ear canal.

In use, hearing aids need to withstand an aggressive environment, wherein sweat, cerumen, residuals of external agents such as soap or hair spray, as well as all kinds of watery substances are in very close proximity to hearing aid components, to the point that these agents might eventually come to interfere therewith. Hearing aids are thus designed to be as tight as possible in order to prevent these substances from entering the devices. It is an especially stringent requirement that humidity be not collected in the hearing aids.

Current solutions dealing with the problem of humidity in hearing aids rely on three main counteracting measures: i) sealing means to prevent humidity infiltration; ii) coatings or barriers to prevent direct contact of humidity with metallic surfaces; and iii) passive membranes to remove humidity which already entered the device.

Nevertheless, corrosion and defects resulting from humidity are still difficult to handle. Additionally, the protection measures currently employed are not only costly, as they require additional manufacturing processes, but might also lead to bulkier devices.

Moreover, it is well known that i) seals tend to become brittle and ii) coatings are liable to de-lamination and capillary effects associated thereto might eventually make matters even worse than in absence of coatings. EP1432285A2, for instance, discloses hydrophobic coatings of hearing aid devices.

Other solutions to the long felt need of finding a way to eliminate humidity from hearing aids have been proposed. In US 2012/0216418 A1, there are disclosed a heating unit for generating warm air and a desalination unit for outputting a desalination agent, applied to a hearing device. Such a configuration entails structural and functional complications which overshadow possible benefits, if indeed the disclosed configuration is at all engineerable.

U.S. Pat. No. 4,987,597 discloses caps for closing openings in hearing aid components which comprise a microporous membrane of anti-adhesive or anti-adherent, possibly hydrophobic material. Removable caps that are meant to be mounted on a casing of a hearing aid imply construction difficulties and, yet again, are liable to humidity infiltrations right at the engagement interface between cap and casing.

As for passive membranes used in state of the art hearing aids to both create a physical barrier to the internal part of such devices and to let already infiltrated humidity out of the devices, their efficiency and usability is in fact vastly limited by the extremely low rate at which they allow humidity drainage.

Such passive membranes are substantially semi-permeable membranes whose functioning relies on osmotic phenomena. Osmosis, as it is known from e.g. biology, defines the spontaneous net movement of solvent molecules through a semi-permeable membrane into a region of higher solute concentration, thus tending to equalize the concentrations of solute on the two sides of the membrane. For instance, in a water tank wherein pure water is separated by way of such a semi-permeable membrane from a solution containing salt ions, water molecules will move from the "fresh" water side to the salt water side, so as to dilute the solution and reduce the osmotic pressure gradient.

The permeability of such passive membranes depends on the size and density of the porosity they integrate, as well as on the osmotic pressure gradient i.e. the difference in concentration of the solute molecule in the (watery) solvent on each side of the membranes.

Just for the sake of clarification, similar passive membranes are also known in far-removed technical fields such as in the manufacture of so called "breathable" clothing. Gore-tex® is a well known semi-permeable membrane, which is used, particularly in outdoor clothing, to allow water vapor to move from one side of a fabric to the opposite side. This promotes sweat elimination from underneath a garment made of such fabric and transport of sweat off a wearer's body. At the same time, a Gore-tex® semi-permeable membrane in a garment prevents water droplets, e.g. rain droplets, from entering the garment. The porosity of a Gore-tex® semi-permeable membrane is large enough to let water vapor through to the outside, but small enough to prevent liquid water from passing to the inside. A typical material used for producing these membranes is expanded Polytetrafluorethylene (ePTFE).

However, as already mentioned, the limits inherent to the physical structure of traditional passive semi-permeable membranes and to the kinetics of the related osmotic processes do not make them suitable to applications wherein a fast and efficient removal of humidity, in the form of liquid and/or vapor, is needed. A fast and efficient removal of humidity is instead evidently paramount in wearable devices incorporating delicate and complex electronic circuitries, such as wearable medical devices and specifically hearing aids. The rates of humidity transport and drainage achieved by normally used passive membranes are low to the extent that any humidity trapped in such wearable devices would anyhow linger inside the devices long enough to bring about chemical reactions between the different materials of their components, to oxidize metal surfaces and contacts, ultimately making them unusable.

WO 2013/026829 discloses an electroosmotic membrane in connection with a textile product such as a waterproof jacket.

There exists a need for a self-drying hearing aid, and for a corresponding method to carry out the drying process in such a hearing aid, which is conceived in a way that:

an effective and thorough drainage of humidity from the inside of the hearing aid and from the components thereof is attained, so that no residual trace of humidity is left;

the removal of such humidity is carried out in a fast process, so that no chance is given to occurred infiltrations to produce damaging alterations within the hearing aid;

the humidity removal is actively executed to the extent that is actually needed, without unnecessary energy wasting.

Accordingly, a major objective of the present invention is to provide a hearing aid with self-drying capabilities which ensures that no infiltrated humidity, either in the form of liquid or in the form of vapour, remains inside its casing and/or in a component of the hearing aid.

Another objective of the present invention is to enhance the rate at which the humidity drainage happens from the inside of a hearing aid to its outside, to a level that no sufficient time is given for chemical reactions and oxidation to happen, or at least to a level that such time is drastically reduced.

Yet another objective of the present invention is to provide a self-drying hearing aid wherein the drying process is optimized in terms of energy consumption and management of execution times.

These problems are solved through a hearing aid, and a correlated method of drying such hearing aid, according to the main claims. Dependent claims further introduce particularly advantageous embodiments for such a device and related method.

The inventive solution basically requires modifying a state of the art wearable device, such as a hearing aid, by appropriately applying to it at least one electroosmotic pump and arranging the membrane so that a transport of liquid and/or vapour outside of the wearable device is established, as induced by an electric current passing between two electrode elements across the electroosmotic membrane.

The design of a hearing device according to the present invention advantageously enables to quickly and totally remove humidity that may have found a point of entry of whatever kind into the casing and/or into a component of the hearing aid. By adopting the present invention, the humidity is transported out of a hearing aid, or more in general out of a wearable device, within a significantly shorter time than with a conventional passive semi-permeable membrane.

In fact, the present invention allows to effectively deal with humidity infiltrations in hearing aids occurred through leaking sealing means; or due to direct diffusion through polymeric materials used for casings or shells; or as a result of micro-droplets movement by capillary effect, for instance beneath delaminated barrier coatings.

The hearing aid design concept according to the present invention also offers the advantages of:
- arresting any deterioration or hearing aid components due to initially infiltrated humidity;
- optimise, both energy-wise and time-wise, the humidity drainage operations;
- adjusting the humidity transport rate by aptly modifying the geometry of a porosity integrated in the electroosmotic pump, thus tailoring the capacity of liquid and/or vapour removal to the cases that most often affect a user category or a specific user.

Other objectives, features and advantages of the present invention will be now described in greater detail with reference to specific embodiments represented in the attached drawings, wherein.

Figure 1:
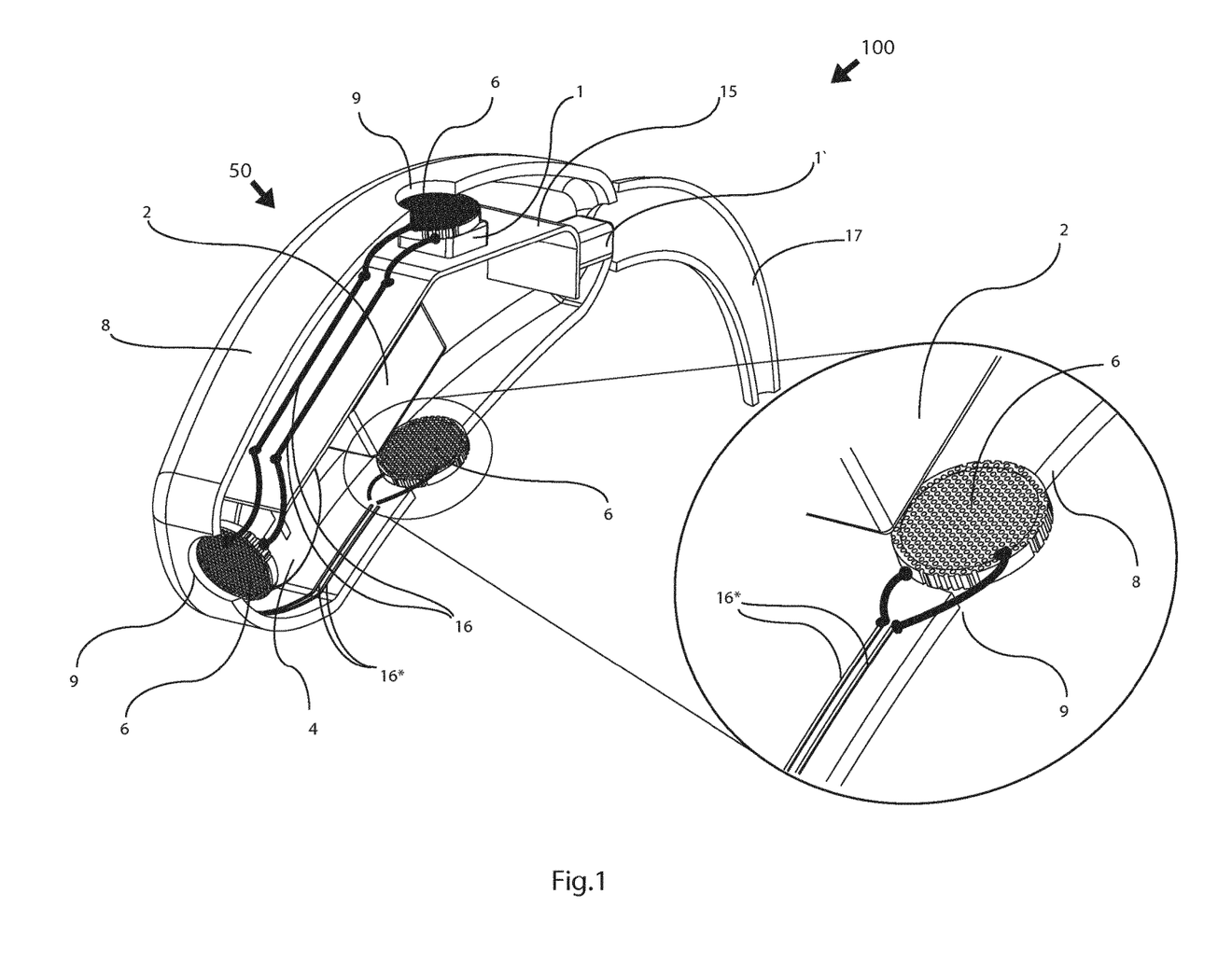
FIG. 1 is a schematic perspective representation, partially in cross section, of a BTE-model hearing aid according to the present invention, wherein the application of three electroosmotic pumps to respective openings in the casing of the device is exemplified.
Figure 6:
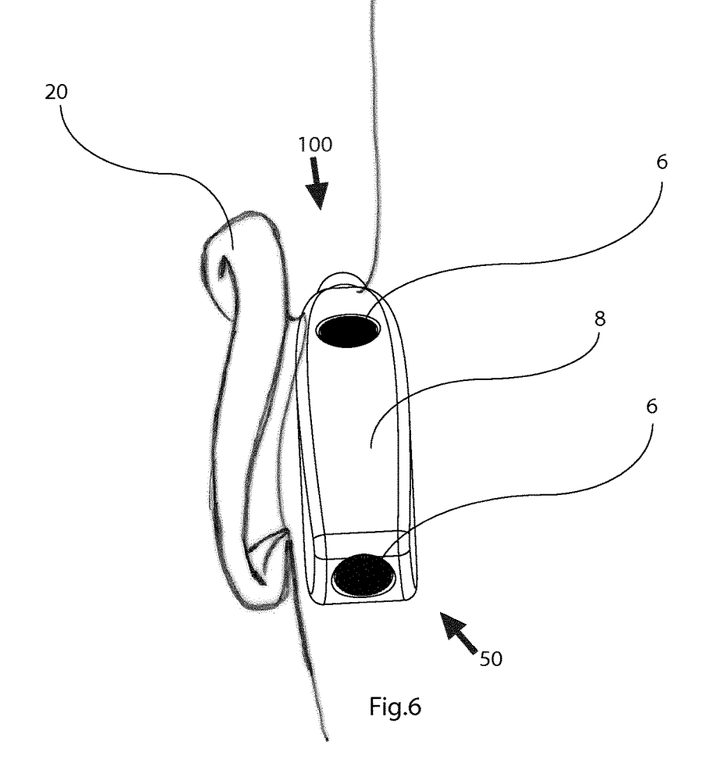
FIG. 6 is a schematic perspective representation of the hearing aid of FIG. 1 or of FIG. 2, when worn by a user, aimed at showing the spatial disposition of the applied electroosmotic pumps, and particularly the provision of such pumps also at a region proximate to the lowest laying portion of an external BTE hearing aid component in a use configuration.

With reference initially to the exemplifying embodiment of FIG. 1 and to FIG. 6, a hearing aid 100 is shown which takes the form of a BTE model, wherein an external hearing aid component 50 is adapted to rest on or behind an ear 20 of a hearing wearer when in use.

A casing 8 of said external hearing aid component 50 accommodates a multiplicity of electric components. According to the terminology commonly employed in the present technical field, a casing can alternatively be designated as a shell, especially in the case of ITEs, CICs and IICs.

Such casing 8 can normally accommodate an electroacoustic transducer working as a microphone 1; an electroacoustic transducer working as a receiver 1'; and a signal processing circuitry configured to receive from the microphone 1 an electrical input signal and to provide the receiver 1' with a corresponding electrical output signal.

As already introduced, a signal processing circuitry typically comprises a processor 2—in digital hearing aids also called digital signal processor (DSP) 2.

Figure 3A:
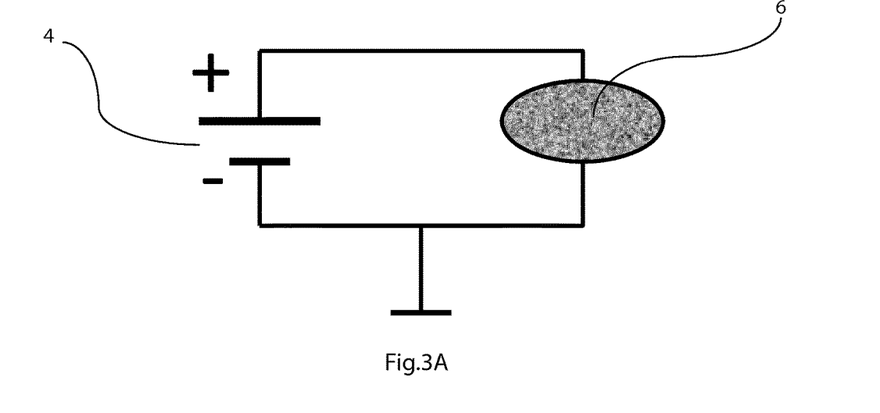
FIG. 3A is a scheme aimed at illustrating the connection of an electroosmotic pump, as applied to a hearing aid according to the present invention, to power supply means of the hearing aid, so that a voltage difference can be established between opposite sides of the electroosmotic pump to allow humidity transport.
Figure 3B:
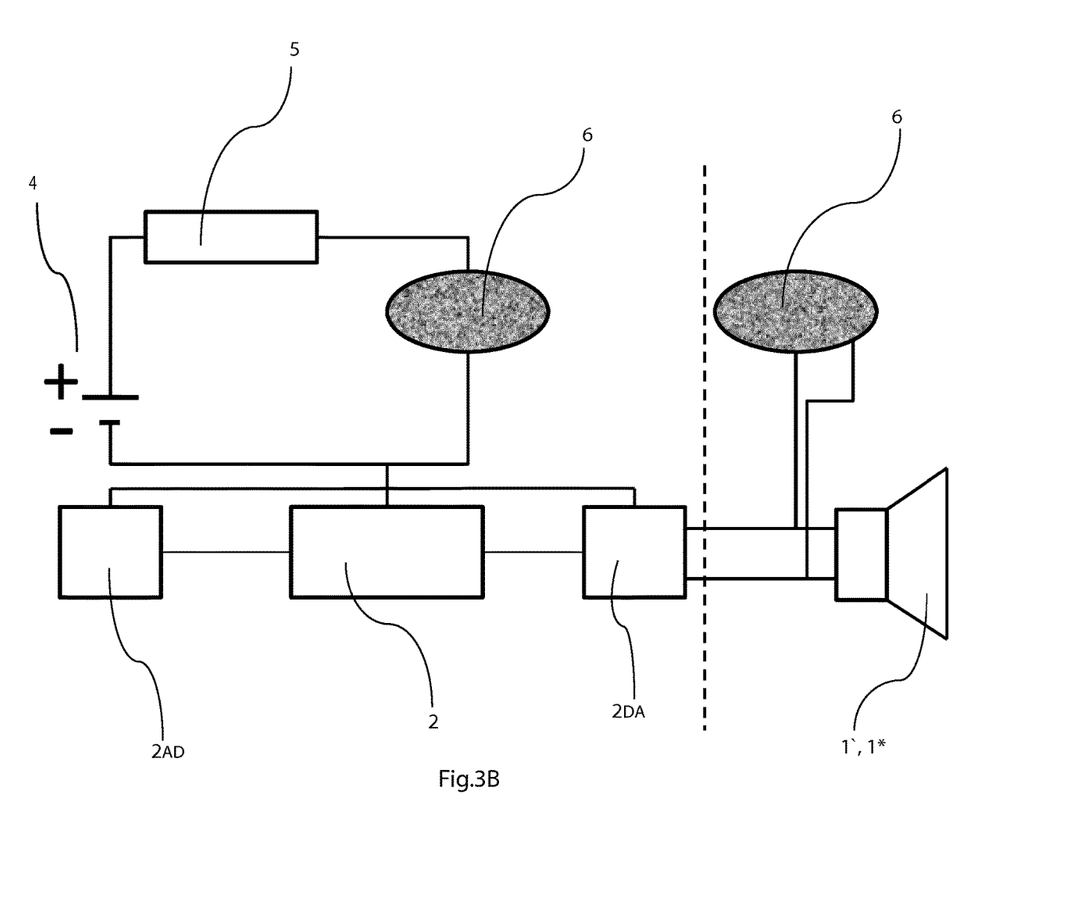
FIG. 3B is a scheme aimed at illustrating the connection of an electroosmotic pump, as applied to a hearing aid according to the present invention, to power supply means of the hearing aid, whereby it is also represented how the power supply means energize a signal processing circuitry of such hearing aid; additionally showing the option of connecting an electroosmotic pump in parallel to a receiver emitting the sound signal outputted by the abovementioned signal processing circuitry.

As evident in the scheme of FIG. 3B, a signal processing circuitry may often also comprise an analog to digital (A/D) converter $2_{AD}$, to convert an analog signal to its digital equivalent, possibly already at the microphone stage; and, after the digital signal processor 2 has performed its tasks, a digital to analog (D/A) converter $2_{DA}$, to convert the digitized signal back to its analog equivalent. The receiver 1' can also integrate the latter function of accomplishing digital to analog conversion.

A sound hook, designated in FIG. 1 with number 17, and/or a sound tubing system are designed to deliver the sound emitted by the receiver 1' into an ear canal of the user. In order to hold the tubing system securely and comfortably in place in the ear canal, an earpiece is generally used which is provided with a seal, otherwise designated as tip or dome, which is fit onto the end of the tubing system and intended for placement inside the ear canal. An output sound, resulting from the conversion of the abovementioned electrical output signal by the receiver 1', is thus outlet and delivered to the user's tympanic membrane, through the sound hook 17 and/or the sound tubing system, ultimately via a sound bore incorporated in the seal.

Such a multiplicity of electric components generally also comprises power storage means 4, configured to provide power to electroacoustic transducers 1, 1' and to the signal processing circuitry, at least during the ordinary use of the hearing aid 100, that is whenever the hearing aid 100 is worn by a user.

A printed circuit board 15 can physically support and wire the transducers 1, 1', as well as the signal processing circuitry, by way of connection means and contacts leading to the power storage means 4.

A power storage means typically comprises batteries, either disposable or rechargeable, or alternatively fuel cells, as indicated by number 4. By way of example, disposable Zinc-air batteries or rechargeable Li-ion batteries can be used.

Such batteries or fuel cells 4 can be configured to be engageable in a respective lid-accessible compartment, which can also be designed to physically shield the main and more delicate parts of the signal processing circuitry.

A power storage means can also comprise voltage regulating means 5, as schematically represented for instance in FIG. 3B, in order to provide a required supply voltage. Depending on the type of batteries or of fuel cells 4, and on the current operation to be performed, the suitable supply voltage might change and may be adjusted thanks to such voltage regulating means 5. Voltage regulating means 5 may come in the form of a DC/DC power converter, for instance for disposable batteries, or of a voltage regulator, for instance for rechargeable batteries.

According to the gist of the present invention, a hearing aid 100 comprises at least one electroosmotic pump 6, configured to transport liquid and/or vapor outside of the hearing aid 100, or away from a component thereof.

The electroosmotic pump 6 comprises a porous intermediate layer 7$i$, which is preferably a semi-permeable membrane as above introduced, and electrode elements 7$p$, 7$n$ disposed on each side of the porous intermediate layer 7$i$. The electroosmotic pump 6 can have a substantially flat shape, such that the electrode elements 7$p$, 7$n$ are disposed on opposite sides of the porous intermediate layer 7$i$. Thus, the electroosmotic pump 6 can ultimately be a relatively thin, pliable sheet forming a semi-permeable barrier. The electroosmotic pump can however also have other shapes. The electrode elements 7$p$, 7$n$ preferably take the form of conductive layers or conductive coatings, such as thin metal layers, deposited over the sides of the porous intermediate layer 7$i$, which functions as a transport substrate. The deposition of the electrode elements 7$p$, 7$n$ can be obtained by way of several possible techniques, for instance plasma spray-physical vapor deposition, chemical vapor deposition, electroplating, thermal spraying, sputter coating or similar. The electrode elements 7$p$, 7$n$ are connected to the power supply means 4, 5 so that transport of liquid and/or vapor is induced by an electric field applied between the electrode elements 7$p$, 7$n$ across the electroosmotic pump 6. The operative connection of the electrode elements 7$p$, 7$n$ to the power supply means 4, 5 can be achieved by in several possible ways.

Figure 5:
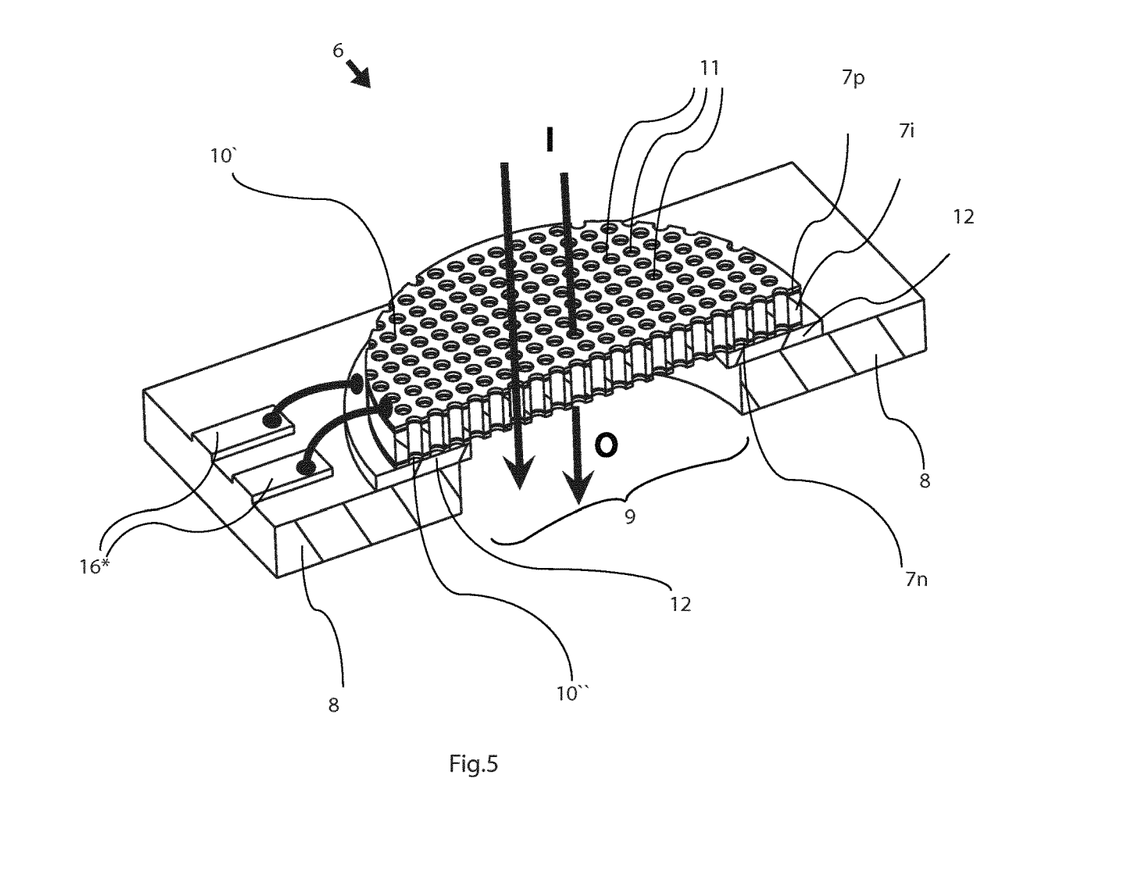
FIG. 5 is a schematic perspective representation, partially in cross section, of an electroosmotic pump applied to an opening of a hearing aid according to the present invention.

The electrode elements 7$p$, 7$n$ are positioned so that when a voltage difference is applied thereto (or established therebetween) by the power supply means 4, 5, a net flux of liquid and/or vapor is determined through the electroosmotic pump 6, from a first entry electrode element, such as electrode element 7$p$, in the direction of a second exit electrode element 7$n$, like represented in FIG. 5.

Preferably, the arrangement of the electroosmotic pump 6 in general, and of the electrode elements 7$p$, 7$n$ more specifically, is such that the flux that overall is established across the electroosmotic pump 6 removes the humidity from inside the hearing aid 100 or transports the humidity away from a component thereof.

With reference to FIG. 1 (and, analogously, to FIG. 2), three distinct electroosmotic pumps 6 are placed in respective positions, associated with openings 9 in the casing 8 of the hearing aid 100. In one case, the electroosmotic pump is also associated with a sound inlet opening, or port, of a microphone 1. Consequently, previously infiltrated liquid and/or vapor can be removed from the nearby portion of the casing 8 and/or away from the microphone 1.

Figure 2:
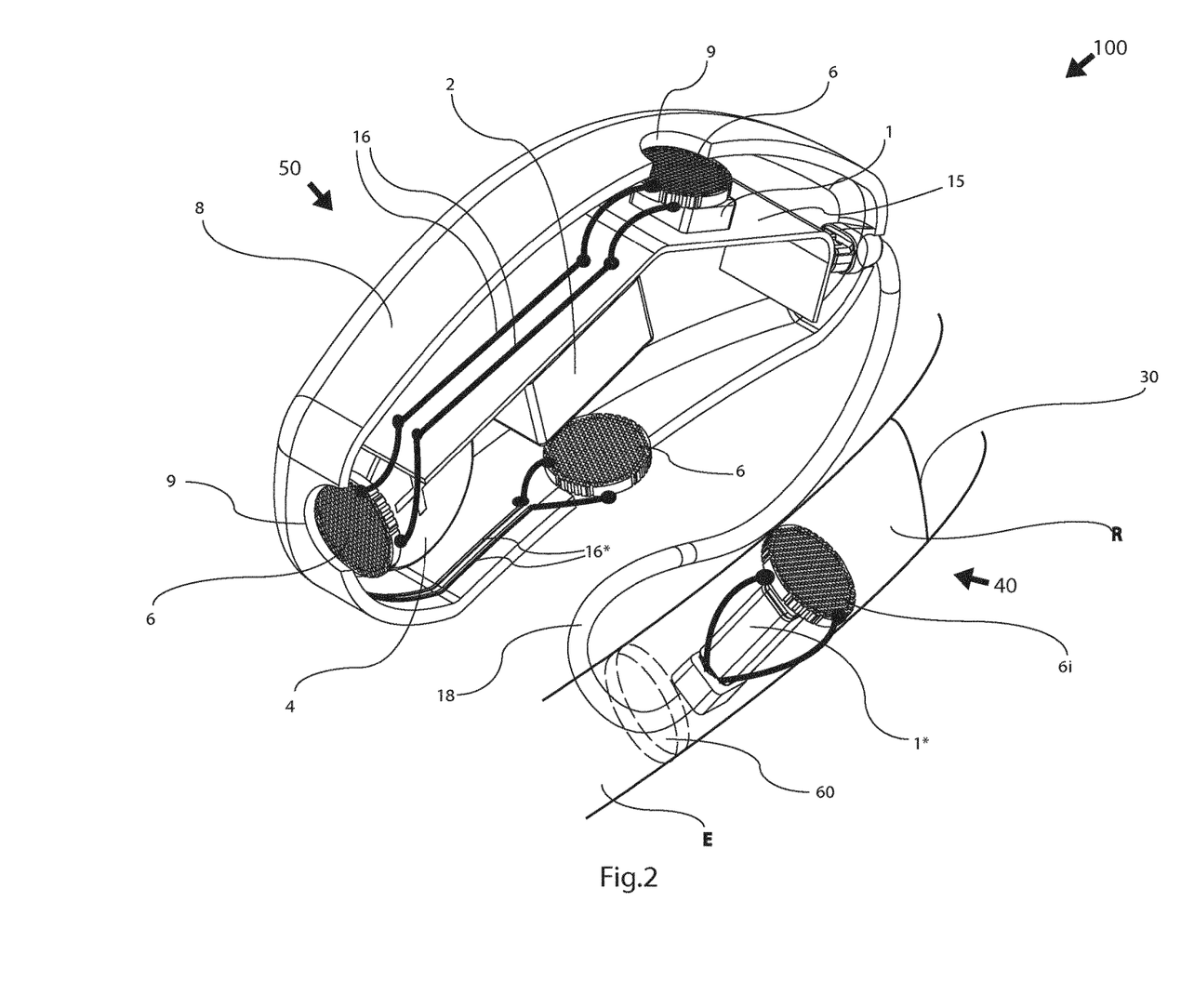
FIG. 2 is a schematic perspective representation, partially in cross section, of a RIC-model hearing aid according to the present invention, wherein the application of four electroosmotic pumps to respective openings in the casing of the device and at the sound outlet of a receiver to be placed in an ear canal is exemplified.

Of course, the embodiments of both FIG. 1 and FIG. 2 can be modified to include further and/or otherwise placed electroosmotic pumps 6. An electroosmotic pump 6 can in general be arranged at, or coupled with, sound inlet openings, sound outlet openings and/or aeration openings and/or user interface openings of said hearing aid or components thereof. For instance, further pumps 6 can be arranged at, or coupled with, the sound outlet opening of the microphones 1, or, in the case of FIG. 1 where the receiver 1' is contained in the external hearing aid component 50, at the sound inlet/outlet openings of the receiver 1'.

Referring by way of example to FIGS. 1, 2 and 5, an electroosmotic pump 6 is preferably positioned across an opening 9 potentially liable to passage of humidity or across a recess liable to accumulation of humidity, whether in the casing 8 and/or at the electroacoustic transducer 1, 1' and/or at the interfaces between a portion of the casing 8 and other hearing aid components, including the electroacoustic transducers 1, 1'. Such interfaces can be also critical points like user control interfaces, where adjusting knobs, buttons, levers or similar are mounted.

Batteries or fuel cells 4 can be engaged in a respective accessible compartment, typically conformed to allow substitution thereof through a lid and concurrently acting as a physical separation to the main and more delicate parts of the signal processing circuitry. In this configuration, an electroosmotic pump 6 can also be placed across such compartment, in order to transport humidity away from the signal processing circuitry into the lid-accessible battery compartment, and even beyond, all the way outside of the overall casing 8 of the hearing aid 100, for instance with the assistance of further electroosmotic pumps 6 such as the one shown at the aeration opening 9 of the casing 8 in FIGS. 1 and 2, in proximity of the power storage means 4.

A multiplicity of electroosmotic pumps 6 can form a drainage path which can effectively remove humidity through successive drainage steps, each drainage step being driven by a respective pump 6, for instance starting at the level of any component of the hearing aid 100 and all the way to the outside thereof. A series of pumps is for instance also portrayed in FIG. 2, wherein electroosmotic pump 6$_i$ cooperates with electroosmotic pump 6$_0$ such that a humidity transport passage, or path, is established between a residual space R between the receiver 1\* and the tympanic membrane 30 and an area E external to the ear canal 40. The direction taken by the humidity in such transport passage through a series of electroosmotic pumps can be made reversible.

With reference to the exemplifying embodiment of FIG. 5, and further to FIGS. 1 and 2, an electroosmotic pump 6 stretches across, or is introduced within, an opening 9 of the casing 8. A first entry surface 10' of the electroosmotic pump 6, wherein first entry electrode elements 7$p$ are deployed, is oriented towards an inside I of the casing 8, whereas a second exit surface 10" of the electroosmotic pump 6, wherein second exit electrode elements 7$n$ are deployed, is oriented towards an outside O of the casing 8, so that a flux of liquid and/or vapor through the electroosmotic pump 6 is established from the first entry surface 10' to the second exit surface 10".

Of course, analogous consideration would apply in case the electroosmotic pump 6 was to be applied to a different support than the casing 8 and/or was to extend across a sound opening of an electroacoustic transducer 1, 1', 1\* or across the opening of any other hearing aid component.

The electroosmotic pump 6 can be preferably affixed to the casing 8 and/or to the electroacoustic transducers 1, 1', 1\* by means of an electrically conductive adhesive means 12. To this purpose, a conductive glue or a conductive epoxy resin may be employed to electromechanically bond the electroosmotic pump to the casing and/or to the electroacoustic transducer. The electrically conductive adhesive means forms a conductive layer through which supply voltages are carried from the power supply means 4, 5 in order to activate the electroosmotic membrane.

The electroosmotic pump 6 is preferably electrically connected to the power supply means 4, 5, via the electrode elements 7$p$, 7$n$, by connection means 16, 16\*. Such connection means can comprise wiring and other conductive elements and can be, for instance, directly embedded into, or 3D printed onto, the casing 8.

The connection means 16* can comprise molded interconnect devices (so-called MID technology) integral to the casing 8; moreover, connection means 16 can be placed onto the printed circuit board 15 shared between the power supply means 4, 5, the electroacoustic transducers 1, 1' and the signal processing circuitry.

With specific reference to FIG. 2, there is exemplified an embodiment wherein a BTE component 50 is connected to an earpiece by an audio signal transmission means, such as a tubing and wiring system 18, and a receiver 1* is designed to be introduced in the ear canal 40 of a hearing aid user, to therein directly deliver sound. Also in this case, analogously to what above described, at least an electroosmotic pump 6 can extend across at least one opening of the receiver 1*. It may also be possible to place two electroosmotic pumps $6_i$, $6_o$ on each side of the receiver 1*. It could be thus created a drainage path allowing to evacuate humidity, such as sweat or other secretions, from a residual space R between the receiver 1* and the tympanic membrane 30, transferring such humidity progressively towards an area E external to the ear canal 40.

Preferably, the electroacoustic pumps 6 according to the present invention are acoustically transparent and do not alter the quality of the sound signal transmitted, particularly when placed at sound inlet or outlet openings, or ports, of electroacoustic transducers 1, 1', 1*.

As explained, the liquid and/or vapor transfer can be activated by applying a voltage difference between electrode elements 7p, 7n of an electroosmotic pump 6, as schematically represented in FIG. 3A and FIG. 3B. A suitable supply voltage from the power supply means 4, 5 can be comprised in a range of 0-5 V, preferably of 1-2 V, in case of disposable power storage means, such as with Zinc-air cells.

Alternatively, in case of rechargeable power storage means, such as Li-ion cells, a suitable supply voltage from the power supply means 4, 5 can be comprised in a range of 0-5 V, preferably of 3-4 V. More specifically, by way of example of respective embodiments, a supply voltage of about 1.2 V could be provided by Zinc-air cells; whereas a supply voltage of about 3.7 V could be provided by Li-ion cells.

Suitable supply voltages for establishing a satisfactory liquid and/or vapor transport, in particular water and/or water vapor transport, across an electroosmotic pump 6 according to the present invention can anyhow be adjusted to whatever type of battery or fuel cells 4 used, (also for instance in case of rechargeable Nickel-metal hydride batteries).

Referring now to FIG. 3B, an optional positioning of an electroosmotic pump 6 is shown at the output of a digital to analog (D/A) converter $2_{DA}$, wherein such pump 6 is disposed electrically in parallel with the receiver 1', 1*. This particular configuration can be useful in that it advantageously reduces the amount of unwanted electrolysis products generated at the electrode elements as a result of electrochemical reactions, in connection with the electroosmosis phenomena. At the output of a digital to analog (D/A) converter $2_{DA}$ normally the flow would happen, under alternating current (AC), as a result of non-linear electrokinetic phenomena. It has been shown that a directional AC electroosmotic net flow of fluid can be produced, especially if appropriate modifications and symmetries are introduced in the geometry, porosity and arrangement of the electrode elements.

Figure 4:
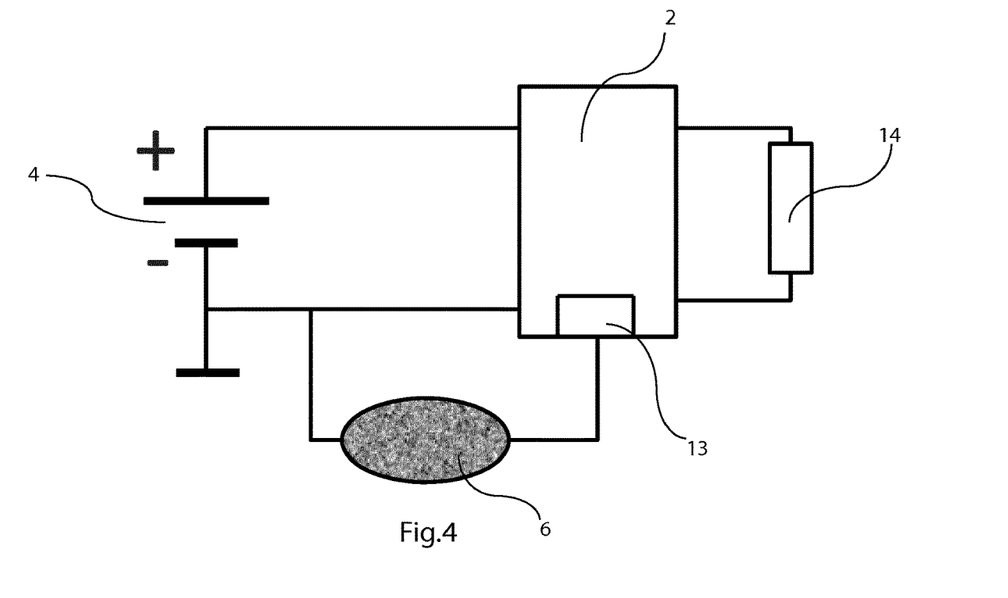
FIG. 4 is a scheme aimed at exemplifying the possibility of automatically controlling, by an additional control circuit, the supply voltage from a power supply means of a hearing aid according to the present invention to an electroosmotic pump, for instance by detection means—such as a humidity sensor—and a connected general purpose input/output pin of a hearing aid signal processing circuitry.

The supply voltage from the power supply means 4, 5 to the electroosmotic pump 6 can be automatically controlled by additional control circuits. An additional control circuit can be coupled to the signal processing circuitry (for instance, in particular to the digital signal processor 2 or DSP), wherein a dedicated software module would coordinate the execution of relative control operations, as shown in FIG. 4.

The additional control circuit can be connected to a general purpose input/output pin 13 (GPIO pin) of the signal processing circuitry 2 configured to carry out the switching on/off of the voltage supply from said power supply means 4, 5 to the electroosmotic pump 6.

The switching on/off of the voltage supply can be responsive to an input by detection means 14 of the additional control circuit and/or by a hearing aid wearer.

The detection means 14 of the additional control circuit can advantageously comprise a humidity sensor to measure a humidity level. The coupled signal processing circuit is thus configured to control the switching on/off of the voltage supply to the electroosmotic pump 6 in function of the level of humidity measured by such sensor. Therefore, the activity of the pump 6 can be calibrated on the actual drainage needs and directly follow the detected presence of humidity.

The detection means 14 of the additional control circuit can also comprise a detection unit for identifying the state of charge of the power supply means 4, so that the switching on/off of the voltage supply to the electroosmotic pump 6 can be also adjusted in function of the measured state of charge. The coupled signal processing circuit is thus configured to control the switching on/off of the voltage supply to the electroosmotic pump 6 in function of the state of charge of the power supply.

Thus, a drying process by the pumps 6 is executed taking into account the actual resource of the battery 4, without preventing good functioning of the hearing aid signal processing circuitry.

In this context, a method of drying a wearable device, and in particular a hearing aid, according to the present invention can comprise the step of applying a supply voltage to the electroosmotic pumps 6 at runtime of the device only if it is verified that the state of charge of a power supply means 4 is higher than a minimum threshold level.

It can be set that the voltage difference is applied to the electroosmotic pump 6 when it is sensed, by respective detection means, that the device is connected to an external power source for recharging the power supply means 4. The control circuit can also instruct that the supply voltage be provided only under such recharging conditions.

For the sake of a thorough drying process, the voltage supply can be applied as long as detection means 14 of the wearable device determine the presence of liquid and/or vapor, or a maximum tolerated pre-set value thereof. The drying process can for instance be regulated so that it goes on for a time span sufficient for the second exit surface 10" of the electroosmotic pump 6 to become dry, following evaporation of the thereto transferred liquid and/or vapor. Such time span can be determined according to the indication of detection means applied to said second exit surface 10".

As explained, an electroosmotic pump 6 incorporates a porosity for the transport of liquid and/or vapor particles. The pores 11 integrated by the intermediate porous layer 7i, and preferably by the electrode elements 7p, 7n (as shown in FIG. 5), can have a diameter equal to, or less than, 1 micrometer. Preferably, the pores 11 have a diameter equal to, or less than, 200 nanometers, for an effective drainage of wearable devices and in particular of hearing aids 100. Preferably, the porous intermediate layer 7i is a semipermeable membrane and the electrode elements 7p, 7n incorporate a further porosity which can be the same as the one of the semi-permeable membrane. At any rate, the porosity of the electrode elements can also be differently sized and shaped from that of the intermediate layer. In general, different porosities can be introduced in respective layers and/or electrode elements. A differential porosity may even be created within a single layer or electrode element, in order to achieve a pre-defined transport speed and/or filtering of the kinds of transferred particles or molecules. By adjusting the porosity parameters, as well as the shape and configuration of the electrodes and/or of the intermediate layer, a fine-tuning of the characteristics of the induced flow can be achieved as desired.

An electroosmotic pump 6 can be applied according to the present invention to a wearable device, such as a hearing aid, also by combining such pump with an unpowered, conventional microphone protection means or by substituting altogether an unpowered, conventional microphone protection means by such pump. In the latter alternative, the electroosmotic pump 6 takes thus the place of the conventional microphone protection means. The unpowered, conventional microphone protection means can take the form of a passive membrane, for instance designed to protect microphones from dust and humidity. In this respect, existing unpowered semi-permeable membranes and vents can be modified and ameliorated in conformity to the teachings of the present invention in order to allow fast and efficient humidity drainage. In FIG. 6 it is shown a hearing aid 100 according to the present invention comprising a BTE component 50 adapted to rest on and/or behind the ear 20 of a user. It is evident how at least one of the electroosmotic pumps 6 is applied at a region proximate to the lowest laying portion of the BTE component 50, in a use configuration. Gravity favors collecting of humidity in this region and as a result drainage therefrom is especially eased.

Figure 7:
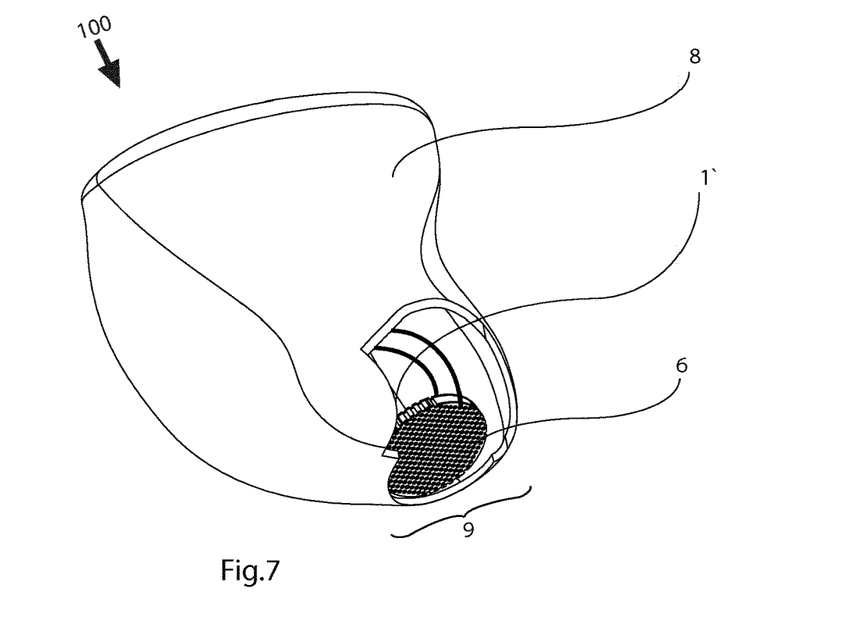
FIG. 7 is a schematic, partially cutaway perspective representation of an ITE-model hearing aid according to the present invention, wherein the application of at least one electroosmotic pump to a respective opening for the sound output of a receiver is exemplified.

FIG. 7 is a schematic perspective representation, partially in cross section, of an ITE-model hearing aid according to the present invention, wherein the application of at least one electroosmotic pump to a respective opening for the sound output of a receiver is exemplified.

Electroosmotic pumps 6 as above described could also be used not only for drying the inside of a wearable device such as a hearing device 100 or for taking humidity away from a component thereof, but also, if the induced flow is expressly reversed, to bring a fluid in the opposite direction, as it could be for instance implemented in the case of FIG. 2. In fact, in FIG. 2, if the direction of flow was reversed from the electroosmotic pump $6_o$ towards the electroosmotic pump $6_i$, for instance by acting on the shape of the electrode elements and/or on the type of current flow, the altered configuration would allow to deliver to the ear canal of a hearing aid user a medicament or a similar active composition in the form of liquid and/or vaporized particles. The same process would also allow to wash the hearing aid internally, for instance to remove detergent or shampoo which entered the device by flushing the device in a cleaning fluid and drying it soon afterwards without opening the device mechanically.

Electroosmotic pumps 6 as introduced can also be employed to either fill the fuel tank of fuel cells or drain the reaction products of fuel cells used as power storage means 4.

As already clarified, in the context of the present invention a hearing aid shall be understood as a device to be worn at the vicinity or directly within the ear of a person to improve the individual hearing capacity of this person.

In light of this, the present invention, which has been described in detail in connection with hearing aid devices, could be modified to be made applicable also to other kinds of wearable devices (e.g. to monitor fitness or to manage busy schedules), in order to achieve a transfer of liquid and/or vapor from an inside of the wearable device to an outside of such a wearable device, and/or away from a component thereof, through an electroosmotic pump 6.

Analogously, the transfer would ensue from the application a voltage difference between a first entry surface 10' of an electroosmotic pump 6 and a second exit surface 10" of the electroosmotic pump 6. In case the electroosmotic pump 6 is applied to a casing 8, at an opening between an inside I and an outside O of a wearable device, as shown in FIG. 5, in FIG. 1 and, in three instances as least also in FIG. 2, the first entry surface 10' is oriented towards the inside I of the wearable device, whereas the second exit surface 10" is oriented towards the outside O of the wearable device In FIG. 7 it is exemplified an embodiment wherein the present invention is incorporated in an ITE-model hearing aid 100.

In the partially cutaway perspective view of the ITE-model hearing aid 100, it is represented how at least one electroosmotic pump 6 extends across a respective opening 9 for the sound output of a receiver 1'.

Thanks to the application according to the present invention of electroosmotic pumps 6 to wearable devices, and in particular to hearing aids 100, the life of the embedded circuitries and of the overall components of such devices is extended and their functionalities remain reliably unaltered by humidity infiltrations. The devices incur fewer malfunctions or breakdowns, as the humidity is quickly removed before oxidation and corrosion can possibly take place.

As a result, repair costs and times, as well as warranty claims, are reduced. Also, the service life of the devices and their usability in different environmental contexts is extended, as they suffer less from a however possible ingress of humidity, whose penetration, especially in rougher conditions, cannot be altogether prevented in the first place.

The invention claimed is:

1. A hearing device, the hearing device comprising:
   an electroacoustic transducer;
   signal processing circuitry configured to receive an electrical input signal from the electroacoustic transducer or to provide the electroacoustic transducer with an electrical output signal;
   a power supply configured to provide power to the electroacoustic transducer and to the signal processing circuitry; and
   an electroosmotic porous membrane configured to transport liquid or vapor,
      wherein the electroosmotic membrane is electronically coupled to electrode elements powered by the power supply.

2. The hearing device of claim 1, wherein the electroosmotic porous membrane is disposed at an opening of the hearing device, wherein the opening comprises a sound inlet opening, a sound outlet opening, an aeration opening, or a user interface opening.

3. The hearing device of claim 1, wherein the electroosmotic porous membrane is a first electroosmotic porous membrane, and wherein the hearing device further comprises:
   a second electroosmotic porous membrane,
      wherein the first electroosmotic porous membrane extends across a first opening, and
      wherein the second electroosmotic porous membrane extends across a second opening.

4. The hearing device of claim 1, wherein the electroosmotic porous membrane further comprises a first surface on the inside of the electroacoustic transducer and a second surface oriented towards an outside of the electroacoustic transducer.

5. The hearing device of claim 1, wherein the electroosmotic porous membrane includes pores having a diameter less than or equal to 200 nanometers.

6. The hearing device of claim 1, wherein the electroosmotic porous membrane includes differently sized or differently shaped pores.

7. The hearing device of claim 1, wherein the porous layer further comprises a semi-permeable membrane.

8. The hearing device of claim 1, wherein the electroosmotic porous membrane is attached to adhesive and the adhesive is attached to a casing for the hearing device.

9. The hearing device of claim 1, wherein the electroosmotic porous membrane is configured to transport liquid or vapor away from an ear canal.

10. The hearing device of claim 1, wherein the electroosmotic porous membrane is configured transport a liquid or a vaporized medicine to an ear canal.

11. The hearing device of claim 1, wherein the hearing device further comprises:
a humidity sensor configured to control a switching on or off of the power to the electrode elements.

12. A method to dry a hearing device, the method comprising:
determining to activate or deactivate an electroosmotic porous membrane in a hearing device based on a liquid or vapor threshold; and
applying or removing a voltage difference between a first surface of the electroosmotic porous membrane and a second surface the electroosmotic porous membrane.

13. The method of claim 12, wherein the voltage difference is applied to the electroosmotic porous membrane at runtime of a hearing device only when it is verified that a state of charge of a power supply of the hearing device is higher than a minimum threshold.

14. The method of claim 12, wherein the voltage difference is applied to the electroosmotic porous membrane when it is verified that the hearing device is connected to an external power source.

15. The method of claim 12, wherein the determining is based on a signal from a humid sensor or signal from a user input.

16. A non-transitory computer readable medium storing instructions, which when executed by a processor, cause a hearing device to perform the following operations:
determining to turn on or off an pump in a hearing device based on a liquid or vapor threshold,
wherein the pump includes an electroosmotic porous membrane,
applying a voltage difference between an entry surface of the electroosmotic porous membrane and a second surface the electroosmotic porous membrane.

17. The non-transitory computer readable medium of claim 16, wherein the voltage difference is applied to the electroosmotic porous membrane at runtime of a hearing device only when it is verified that a state of charge of a power supply of the hearing device is higher than a minimum threshold.

18. The non-transitory computer readable medium of claim 16, wherein the voltage difference is applied to the electroosmotic porous membrane when it is verified that the hearing device is connected to an external power source.

19. The non-transitory computer readable medium of claim 16, wherein the determining is based on a signal from a humid sensor or signal from a user input.

20. The non-transitory computer readable medium of claim 16, wherein the electroosmotic porous membrane is configured transport a liquid or a vaporized medicine to an ear canal.

* * * * *